United States Patent
Lorenz et al.

(10) Patent No.: US 9,015,016 B2
(45) Date of Patent: Apr. 21, 2015

(54) SYSTEM AND METHOD FOR THREE-DIMENSIONAL SCHEMATIC CAPTURE AND RESULT VISUALIZATION OF MULTI-PHYSICS SYSTEM MODELS

(75) Inventors: Gunar Lorenz, St. Remy les Chevreuse (FR); Mattan Kamon, Arlington, MA (US)

(73) Assignee: Coventor, Inc., Cary, NC (US)

( * ) Notice: Subject to any disclaimer, the term of this patent is extended or adjusted under 35 U.S.C. 154(b) by 469 days.

(21) Appl. No.: 12/323,058

(22) Filed: Nov. 25, 2008

(65) Prior Publication Data

US 2009/0144042 A1 Jun. 4, 2009

Related U.S. Application Data

(60) Provisional application No. 60/991,249, filed on Nov. 30, 2007.

(51) Int. Cl.
*G06G 7/48* (2006.01)
*G06F 17/50* (2006.01)

(52) U.S. Cl.
CPC ........ *G06F 17/5009* (2013.01); *G06F 17/5022* (2013.01); *G06F 17/5045* (2013.01); *G06F 17/5086* (2013.01); *G06F 2217/02* (2013.01); *G06F 2217/66* (2013.01); *G06F 2217/74* (2013.01); *G06F 2217/86* (2013.01)

(58) Field of Classification Search
CPC .................................................. G06F 17/5086
USPC ............ 703/1, 3, 4, 6, 7, 13, 14, 16; 716/100, 716/106
See application file for complete search history.

(56) References Cited

U.S. PATENT DOCUMENTS

| | | | | |
|---|---|---|---|---|
| 7,131,105 | B2 * | 10/2006 | Lorenz et al. | 716/102 |
| 7,263,674 | B2 * | 8/2007 | Lorenz | 716/102 |
| 2005/0066301 | A1 * | 3/2005 | Lorenz et al. | 716/20 |
| 2005/0125750 | A1 * | 6/2005 | Lorenz | 716/4 |
| 2011/0093250 | A1 * | 4/2011 | Lin | 703/7 |

OTHER PUBLICATIONS

Baldwin et al. "Modularity in the Design of Complex Engineering Systems", Sep. 2006.*
Mukherjee, Tamal. "MEMS Design and Verification", IEEE 2003.*
Zha et al. "Manufacturing Process and Material Selection in Concurrent Collaborative Design of MEMS Devices", Journal of Micromechanics and Microengineering, 2003 IOP Publishing Ltd.*

(Continued)

*Primary Examiner* — Akash Saxena
(74) *Attorney, Agent, or Firm* — Nelson Mullins Riley & Scarborough LLP; John S. Curran, Esq.

(57) ABSTRACT

A 3-D multi-physics design environment ("3-D design environment") for designing and simulating multi-physics devices such as MEMS devices is discussed. The 3-D design environment is programmatically integrated with a system modeling environment that is suitable for system-level design and simulation of analog-signal ICs, mixed-signal ICs and multi-physics systems. A parameterized MEMS device model is created in a 3-D graphical view in the 3-D design environment using parameterized model components that are each associated with an underlying behavioral model. After the MEMS device model is completed, it may be exported to a system modeling environment without subjecting the model to preliminary finite element meshing.

32 Claims, 16 Drawing Sheets

(56) References Cited

OTHER PUBLICATIONS

Gilbert et al. "Integrating CAD Tools for MEMS Design", Apr. 1998.*

"N/MEMS Design Methodologies Efficient workflow for robust, first-time-right design" White Paper by Sandeep Akkaraju CEO, IntelliSense Woburn, MA (2010) pp. 1-22.*

Lee, W.F. et al., "Electrical Modeling of MEMS Sensor for Integrated Accelerometer Applications," *Proceedings of the IEEE Hong Kong Electron Devices Meeting*, pp. 88-91 (1999).

Lorenz, Gunar et al., "A System-Model-Based Design Environment for 3D Simulation and Animation of Micro-Electro-Mechanical Systems (MEMS)," *APCOM'07 in conjunction with EPMESC XI*, (2007).

Mandelbaum, Cecile et al., "Behavioral Modeling and Simulation of Micromechanical Resonator for Communications Applications," *Symposium on Design, Test, Integration and Packaging of MEMS/MOEMS*, pp. 21-26 (2003).

International Search Report and Written Opinion for Application No. PCT/US2008/084703, dated Dec. 17, 2009.

Chen, Richard T. et al., "Leveraging Mainstream Design and Analysis Tools for MEMS," *IEEE/CPMT/SEMI 29th International Electronics Manufacturing Technology Symposium*, pp. 332-337 (2004).

Courtois, B. et al., "Design and Test of MEMS," *Proceedings of the 12th International Conference on VLSI Design*, pp. 270-275 (1999).

Nagler, Oliver et al., "Efficient design and optimization of MEMS by integrating commercial simulation tools," *Transducers '97 1997 International Conference on Solid-State Sensors and Actuators*, pp. 1055-1058 (1997).

Chinese Office Action for Application No. 200880126135.5, 15 pages, dated Apr. 2, 2013.

* cited by examiner

| Name | Expression | Units |
|---|---|---|
| ⊟ Aluminum | | |
|   ⊟ Visual Properties | | |
|   ⊟ Material Type: Solid ▼ | | |
|     ⊟ Solid | | |
|       ⊞ Wafer Orientation: Euler Angles ▼ | | |
|       Density | 2300 | kg/m^3 ▼ |
|       ⊞ Elastic Constants: Isotropic ▼ | | |
|       ⊞ PreStress: In-plane Isotropic ▼ | | |
|       ⊞ Stress Gradient in Z: In-plane Isotrop ▼ | | |
|       ⊞ Thermal Coefficient of Expansion | | |
|       Thermal Conductivity | 240 | W/(m*K) ▼ |
|       Specific Heat | 930 | J/(kg*K) ▼ |
|       Electrical Conductivity | .8*T^2-1e6*T+2e8 | S/m ▼ |
|       Piezoelectric Coefficients: undef ▼ | | |
|       ⊞ Relative Permittivity: Isotropic ▼ | | |
|     ⊞ Piezoresistive Coefficients | | |
|     Relative Permeability | | |
|     Coercivity | | A/m |
|     Saturation Magnetization | | T |
| ⊞ Si3N4 | | |
| ⊞ THERM_OXIDE | | |
| ⊞ SILICON | | |

Variables

| Name | Value | Exposed | |
|---|---|---|---|
| T | 273.15 | ☑ true | |
| | undef | ☐ false | |

*Fig. 6A*

SYSTEM AND METHOD FOR THREE-DIMENSIONAL SCHEMATIC CAPTURE AND RESULT VISUALIZATION OF MULTI-PHYSICS SYSTEM MODELS

RELATED APPLICATION

This application claims the benefit of a U.S. provisional patent Application entitled "A System and Method for Three-Dimensional Schematic Capture and Result Visualization of Multi-Physics System Models", Application No. 60/991,249, filed on Nov. 30, 2007.

FIELD OF THE INVENTION

The embodiments of the present invention relate generally to simulating the physical behavior of multi-physics systems and more particularly to the creation of a parameterized behavioral model for a multi-physics device in a three-dimensional (3-D) design environment and the subsequent use of the created model in the 3-D design environment and an integrated system modeling environment.

BACKGROUND

Computer Aided Design (CAD) and Computer Aided Engineering (CAE) tools are used, respectively, to design and simulate virtual models of mechanical devices prior to producing actual physical devices. Similarly, Electronic Design Automation (EDA) tools are used to design and simulate virtual models of electrical and electronic devices prior to producing actual physical devices. CAD, CAE, and EDA tools are interactive software programs that run on a digital computer with a graphical display device. Attributes of CAD/CAE tools and EDA tools must be combined to design and simulate virtual models of multi-physics devices such as Micro Electro-Mechanical Systems (MEMS) devices prior to beginning the costly and time-consuming process of fabricating the actual physical devices.

MEMS are micro-scale or nano-scale devices, typically fabricated in a similar fashion as integrated circuits (ICs), to exploit the miniaturization, integration, and batch processing attainable with semiconductor manufacturing processes. Unlike ICs which consist solely of electrical components, MEMS devices combine components from multiple physical domains and may contain, for example, electrical, mechanical, magnetic, radio frequency (RF), optical and fluidic components. MEMS devices appear in many forms and may include micro-electromechanical sensors and actuators such as gyroscopes, accelerometers, and pressure sensors, microfluidic devices such as ink jet heads, Radio-Frequency (RF) devices such as switches, resonators, varactors, and passives, and optical devices such as micro-mirrors and fiber alignment devices. Typically, MEMS devices are not useful by themselves. To provide a useful function, a MEMS device must be incorporated in a system that includes electronic circuits that either control the MEMS devices or process electrical output signals from the MEMS devices. Most MEMS devices are comprised of a MEMS sensing or actuation element, i.e. the MEMS device itself, and accompanying electronics, i.e. IC, that processes the output signal from the MEMS device and/or controls the MEMS device.

BRIEF SUMMARY

The embodiments of the present invention provide a 3-D multi-physics design environment ("3-D design environment") for designing and simulating multi-physics devices such as MEMS devices. The 3-D design environment is programmatically integrated with a system modeling environment that is suitable for system-level design and simulation of analog-signal ICs, mixed-signal ICs and multi-physics systems. A parameterized MEMS device model is created in a 3-D graphical view in the 3-D design environment using parameterized model components. The parameterized model components are each associated with an underlying behavioral model and may be selected from a multi-physics/MEMS component library. After the MEMS device model is completed, it may be exported to a system modeling environment. The MEMS device model may be exported to the system modeling environment without subjecting the model to preliminary finite element meshing.

The exported MEMS device model allows circuit simulations involving the MEMS device and associated electronic circuitry to be conducted in the system modeling environment. Circuit simulation results may be transferred back into the 3-D design environment in order to be visualized using the 3-D view generators of the 3-D design environment. The 3-D view may display an animation of the mechanical motion of the MEMS device. The user may then export a parameterized layout cell to a layout editor that can be used to directly generate a layout of the MEMS device.

In one embodiment, a computer-implemented method of designing and simulating Micro Electro-Mechanical System (MEMS) devices includes selecting parameterized components via a 3-D design environment. Each of the parameterized components is associated with a behavioral model. The method creates a parameterized MEMS device model in the 3-D design environment using the selected parameterized components. The MEMS device model is exported into a system modeling environment for use in a circuit simulation or co-simulation.

In another embodiment, a computer-implemented method of designing and simulating MEMS devices includes importing a parameterized MEMS device model into a system modeling environment, the parameterized MEMS device model having been created in a 3-D design environment from parameterized components. Each of the parameterized components is associated with a behavioral model. A symbol representative of the parameterized MEMS device model is connected into a schematic in the system modeling environment which displays an integrated circuit (IC) design. A circuit simulation or co-simulation of the schematic is performed in the system modeling environment.

In another embodiment, a computer-implemented system for designing and simulating Micro Electro-Mechanical System (MEMS) devices includes a computing device and a display device. The computing device hosts, or is in communication with, a three-dimensional (3-D) MEMS design environment and a system modeling environment. The 3-D MEMS design environment enables selecting parameterized components via the three-dimensional (3-D) MEMS design environment. Each of the parameterized components is associated with a behavioral model. The 3-D MEMS design environment is used to create a parameterized MEMS device model in the 3-D design environment with the selected parameterized components. The 3-D MEMS design environment also allows the exporting of the MEMS device model into the system modeling environment. The results of a circuit simulation or co-simulation of a schematic design that is performed in the system modeling environment utilizing the exported MEMS device model are received in the 3-D design environment. The display device is in communication with the computing device and displays the results of the circuit simulation or co-simulation in the 3-D design environment.

BRIEF DESCRIPTION OF THE DRAWINGS

The accompanying drawings, which are incorporated in and constitute a part of this specification, illustrate one or more embodiments of the invention and, together with the description, explain the invention. In the drawings:

FIG. 6A depicts a first external editor, a material property editor;

DETAILED DESCRIPTION

Figure 1:
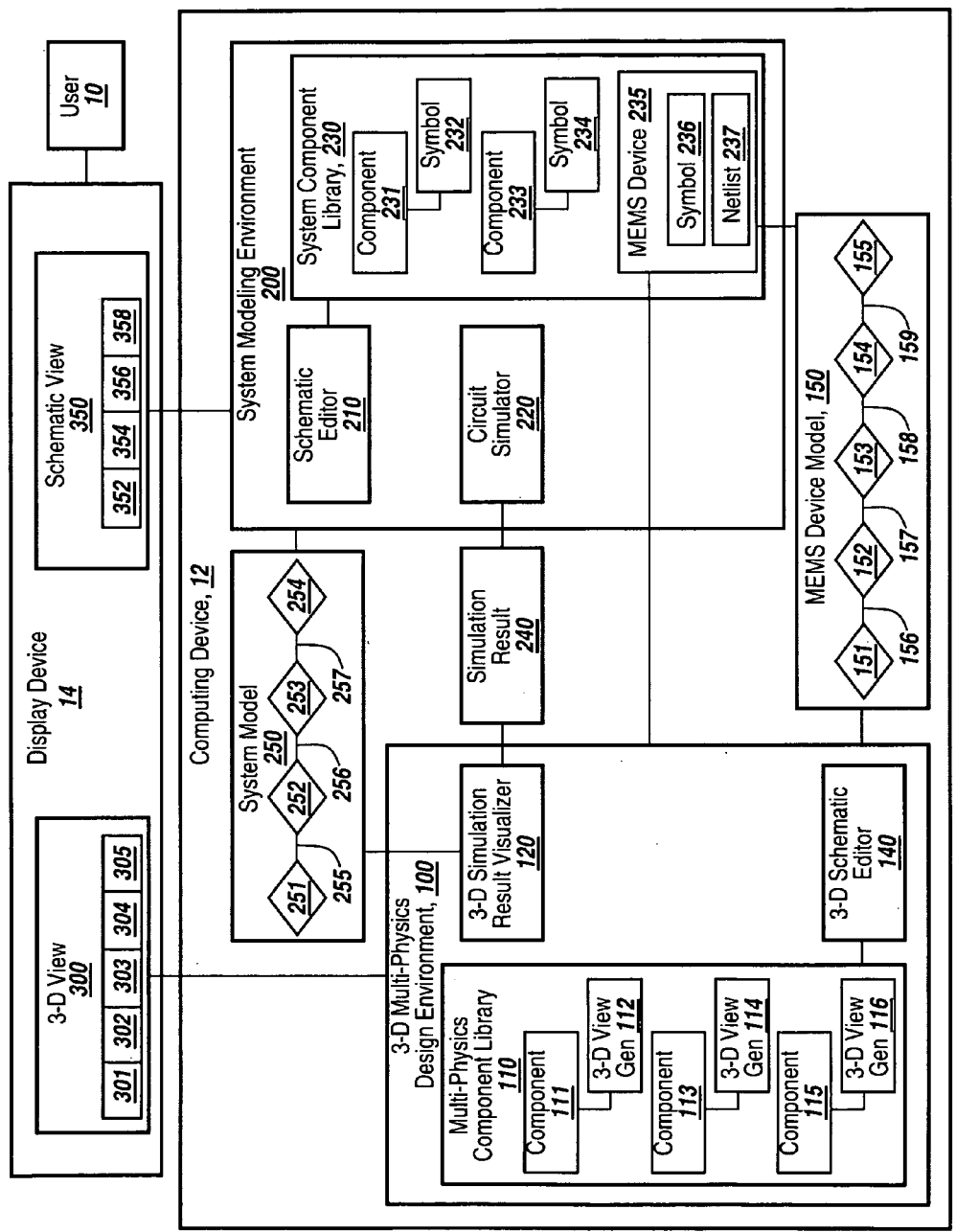
FIG. 1 depicts an environment suitable for practicing an embodiment of the present invention.

The embodiments of the present invention enable the creation of a multi-physics device model, such as a MEMS device model, in a three-dimensional (3-D) design environment that is integrated with a system modeling environment. The created device model differs from a model created in a typical feature-based 3-D CAD modeling tool in that there is an underlying behavioral model associated with each component of the created device model. The created device model may be exported to a system modeling environment where it can be integrated into a schematic design and used in performing a circuit simulation or co-simulation. The behavioral model for the created device may be parameterized with respect to manufacturing and design dependent variables such as material properties and dimensional variations, as well as geometric properties of the design. The results of system-level simulations or co-simulations performed in the system modeling environment can subsequently be loaded back into the 3-D design environment for result visualization and animation. A user viewing the displayed results in the 3-D design environment may indicate satisfaction with the results and a parameterized 2-D layout cell may be programmatically generated and sent to a 2-D layout editor in the system modeling environment.

The embodiments of the present invention discussed herein allow the creation and utilization of a multi-physics device model such as a MEMS device model. For clarity of explanation, the created model is referred to herein as a MEMS device model. It should be understood however that other types of multi-physics device models in addition to MEMS device models may be created and utilized by practicing the embodiments of the present invention.

As previously noted, most MEMS devices include both a MEMS sensing or actuation element and an IC that processes the output signal from the MEMS device and/or controls the device. The dual nature of MEMS devices has caused a number of problems during the design process as MEMS designers and IC designers are accustomed to working in distinct specialized design environments. For example, a MEMS designer is frequently trained as a mechanical engineer who is used to designing with three dimensional CAD and CAE tools. In contrast, IC designers are typically trained as electrical engineers and almost universally rely on IC design and simulation environments (e.g.: Cadence VIRTUOSO or Mentor Graphics platforms) that are used to create a schematic of electronics in a schematic editor which is then simulated in a circuit simulator. Each design environment has its strengths and weaknesses and the disconnect between the design environments has conventionally caused issues in designing and simulating a MEMS device in its entirety.

For example, one commonly used approach in designing and simulating a MEMS device, referred to herein as physical design and simulation, uses mechanical CAD and CAE tools to create a three-dimensional geometric model of the device and then applies a discrete numerical technique such as the finite element method (FEM), to numerically solve the partial differential equations that represent the physical behavior of the device. This approach is typified by commercial products such as ANSYS and ABAQUS. The physical design and simulation results can be presented in a 3-D view. However, this approach has the significant disadvantages that it is very time consuming and there is no straight-forward way to simulate mechanical behavior of the MEMS in conjunction with the surrounding electronic circuits that are required to have a useful system.

An alternative approach to designing and simulating a MEMS device, referred to herein as system-level design and simulation, uses a system modeling environment in conjunction with a specialized library of MEMS components. The system modeling environment includes a schematic editor (or schematic capture tool) and a circuit simulator. This approach is typified by CoventorWare ARCHITECT and has the advantages that it is usually one-to-two orders-of-magnitude faster than the FEM approach, and that it enables the inclusion of electronic circuits in the simulation. CoventorWare ARCHITECT incorporates the Synopys SABER system modeling environment. Other examples of commercially available system modeling environments include, but are not limited to, Cadence VIRTUOSO, Mentor SYSTEMVISION and Ansoft SIMPLORER.

While the system-level approach to MEMS design has been successful, there are drawbacks to using a symbolic schematic to capture the design of a MEMS device. A symbolic schematic, essentially a wiring diagram providing an abstract map of all component models and their interconnections, is an intuitive way to describe the design of an electronic device, but it is not an intuitive way of describing a three-dimensional mechanical device because the geometry, position and orientation of each modeled substructure is defined by the parameters of the corresponding schematic symbol. Minor parameter changes can result in substantially different device geometry and/or optical system setups that are not apparent from the symbolic schematic. Conventional EDA tools only allow the user to generate a two-dimensional layout from a symbolic schematic. More recently, tools such as CoventorWare ARCHITECT have included 3-D visualization capabilities for understanding and verifying the parameter settings and symbol connectivity of non-electrical structures like MEMS. However, even with these more recent tools, the user still must first capture the design in a symbolic schematic. Every change to the schematic, whether adding a symbol or changing a parameter value in one of the MEMS component models, requires verification by either layout generation or 3-D visualization. Thus, despite the progress in the visualization of schematic-based MEMS designs, users must repeatedly go back and forth between the symbolic schematic and the 3-D or layout view during the schematic-capture process.

Another alternative approach, combines elements of the physical and system-level design and simulations approaches, and is referred to herein as the hybrid approach. This approach uses physical design and simulation to create components for a MEMS component library, and system-level design and simulation to simulate the combined behavior of the components. The hybrid approach has some of the advantages of the system-level approach, namely that simulations require less computing resources (memory and time) than physical simulations. But the hybrid approach also has disadvantages relative to the system-level approach in regard to the nature of the components in the MEMS component library. In particular, the parameterization of the MEMS components is limited, and requires multiple time-consuming and potentially error-prone steps to create and simulate the MEMS components. Additionally, the behavioral models underlying the MEMS components are obtained by polynomial curve fitting which may be an additional source of error. Like the system-level approach, a symbolic schematic of the MEMS device must be composed in a schematic editor by assembling components from the MEMS component library. Both the system-level and hybrid approaches may be referred to as schematic-based design and simulation approaches.

A further issue in MEMS design is that both MEMS engineers and the IC engineers frequently express the need to co-simulate the MEMS and IC designs in a common simulation environment. Co-simulation is required to verify the IC design and to predict yield sensitivity to manufacturing variations. If the simulation is run in the IC design environment, the MEMS designers are required to deliver a behavioral model of the MEMS device expressed in a suitable hardware description language (HDL) such as Verilog-A or VHDL-AMS. Today, MEMS engineers have very limited ability to deliver behavioral models in these formats. The only options are to handcraft a model, usually in the form of a lookup table, or generate a reduced-order model from finite element analysis. Both of these options result in non-parametric models, i.e. point designs, which are not useful for yield analysis and are not reusable.

The embodiments of the present invention address these shortcomings in MEMS design by enabling a user to construct a MEMS device by assembling parameterized components directly in a 3-D view in a design environment. The created MEMS device model, which is used for system modeling, is automatically created by the 3-D design environment from the behavioral models of the individual MEMS components selected by the user. The MEMS device model may be automatically transferred to the system modeling environment for simulation without requiring the model to first undergo FEM. This process of creating a 3-D schematic by assembling components in a 3-D view is called "three-dimensional schematic capture".

This 3-D approach is more natural to MEMS designers, and saves time by allowing the designers to work from one 3-D view instead of alternating between a symbolic schematic view and a 3-D view. The exported MEMS device model allows for circuit simulations involving both the created MEMS device and the associated electronic circuitry in the system modeling environment. An additional benefit provided by the embodiments of the present invention is that the described 3-D design environment can be used in an integrated fashion with existing system modeling environments.

FIG. 1 depicts an environment suitable for practicing embodiments of the present invention. FIGS. 2-10 describe various interactions between the components illustrated in FIG. 1. FIG. 1 is referenced throughout the detailed description.

A computing device 12 holding a 3-D multi-physics design environment 100 ("3-D design environment") and a schematic-based system modeling environment 200 is illustrated in FIG. 1. The computing device 12 may be a server, workstation, laptop, or some other type of electronic device equipped with a processor and capable of supporting the 3-D design environment 100 and the system modeling environment 200. The 3-D design environment 100 may include a MEMS component library 110, a 3-D simulation result visualizer 120, and a 3-D schematic editor 140. It will be appreciated that the individual components depicted in FIG. 1 may appear in combination or in different configurations from those depicted in FIG. 1 without departing from the scope of the present invention.

The 3-D schematic editor 140 is used to create and/or edit a 3-D MEMS device model 150. The user 10 assembles a MEMS device model 150 in the 3-D design environment 100 by selecting one or more instances of MEMS components 111, 113 and 115 from the MEMS component library 110 and configures the component parameters. Component parameters can be entered in the form of numbers or as an algebraic expression that references one or more global variables. All global variables used to parameterize the MEMS device 150 may be stored and defined in the 3-D design environment 100.

The library components 111, 113 and 115 may represent entities from different physical domains, such as masses, plates, magnets, lasers, optical lenses, electrostatic comb structures and electrodes. The component parameters may include geometrical dimensions such as position, orientation, length, width and height, layer names or material properties like density and modulus of elasticity. Component parameters may be entered in the form of numbers or as an expression of one or more global variables. An alternative approach for defining geometrical component parameters receives point selections or freeform drawing on a 2-D or 3-D canvas.

Each model component in the MEMS component library 110 may include a mathematical behavioral model represented by components 111, 113 and 115, and a corresponding 3-D view generator 112, 114 and 116 that is a computer script or program containing the information needed to draw a 3-D graphical view of each component. The underlying behavioral models of each component describe how the individual components behave mathematically when subjected to electrical or mechanical stimuli, or stimuli from other domains. 3-D view generators 112, 114 and 116 use the parameter information (optionally together with other design information like the fabrication process description) to create a 3-D image 301, 302, 303, 304 and 305 of the components 151, 152, 153, 154 and 155 after the user 10 successfully completes the parameter input.

The underlying behavioral models are distinct from finite element models in that they use whatever mathematical (analytical) or numerical formulation is most efficient for representing the physical behavior of the modeled entity as opposed to generic shape functions that have a polynomial or other standard basis as is the case with finite elements. A suspension of a typical MEMS device, for instance, can typically be modeled as a collection of mechanical beam segments. Other components that can be assembled to model MEMS devices may include rigid and flexible mechanical plates of various shapes (rectangular, triangular, arc segments, etc.), inter-digitated electrostatic comb drives of various shapes and configurations, and flat or curved electrodes that may be placed above, below or to the side of any of the above mentioned mechanical elements. Each of these components must have an associated behavioral model that efficiently represents its physical behavior. The behavioral model for a mechanical beam may be an analytical solution of a well known beam theory, such as the Euler-Bernoulli beam equation. Such a mathematical solution may be expressed explicitly in terms of the geometric parameters of the beam such as its length, width and thickness, and material properties such as Young's modulus. In addition, the behavioral model may have mechanical connection points such as the ends of a beam that specify where and how it can be connected to other mechanical components. The behavior of a rigid plate segment may be modeled by the equations governing rigid body dynamics, which depend on its inertial coefficients, which can in turn be expressed explicitly in terms of its geometric parameters and density. The behavioral models for electrostatic forces between electrodes and mechanical elements may be modeled by the simple equations for electrostatic force between flat plates of equivalent size, or by more sophisticated means such as conformal mapping in the case of inter-digitated comb fingers.

The user assembles the MEMS device model in the 3-D view 300 by connecting representations of the selected components 111, 113 and 115. The representations of the components are generated by 3-D view generators 112, 114 and 116 respectively associated with the selected components. The 3-D design environment saves the connection information that indicates how the components were connected by the user in the 3-D view. The data structure underlying the model constructed in the 3-D view 300 is referred to as a multi-physics or MEMS device model and contains references to the constituent components 301, 302, 303, 304 and 305, their underlying behavioral models, and data that indicates how the components 301, 302, 303, 304 and 305 are connected. The MEMS device model 150 constructed in the 3-D view may be directly exported to a system modeling environment without additional meshing to form part of a system model of a MEMS device.

One of ordinary skill in the art will appreciate that the MEMS component library 110 may include any number of components and corresponding 3-D view generators. The number of components and corresponding 3-D view generators illustrated in FIG. 1 are for illustrative purposes only and should not be deemed as limiting.

Figure 2A:
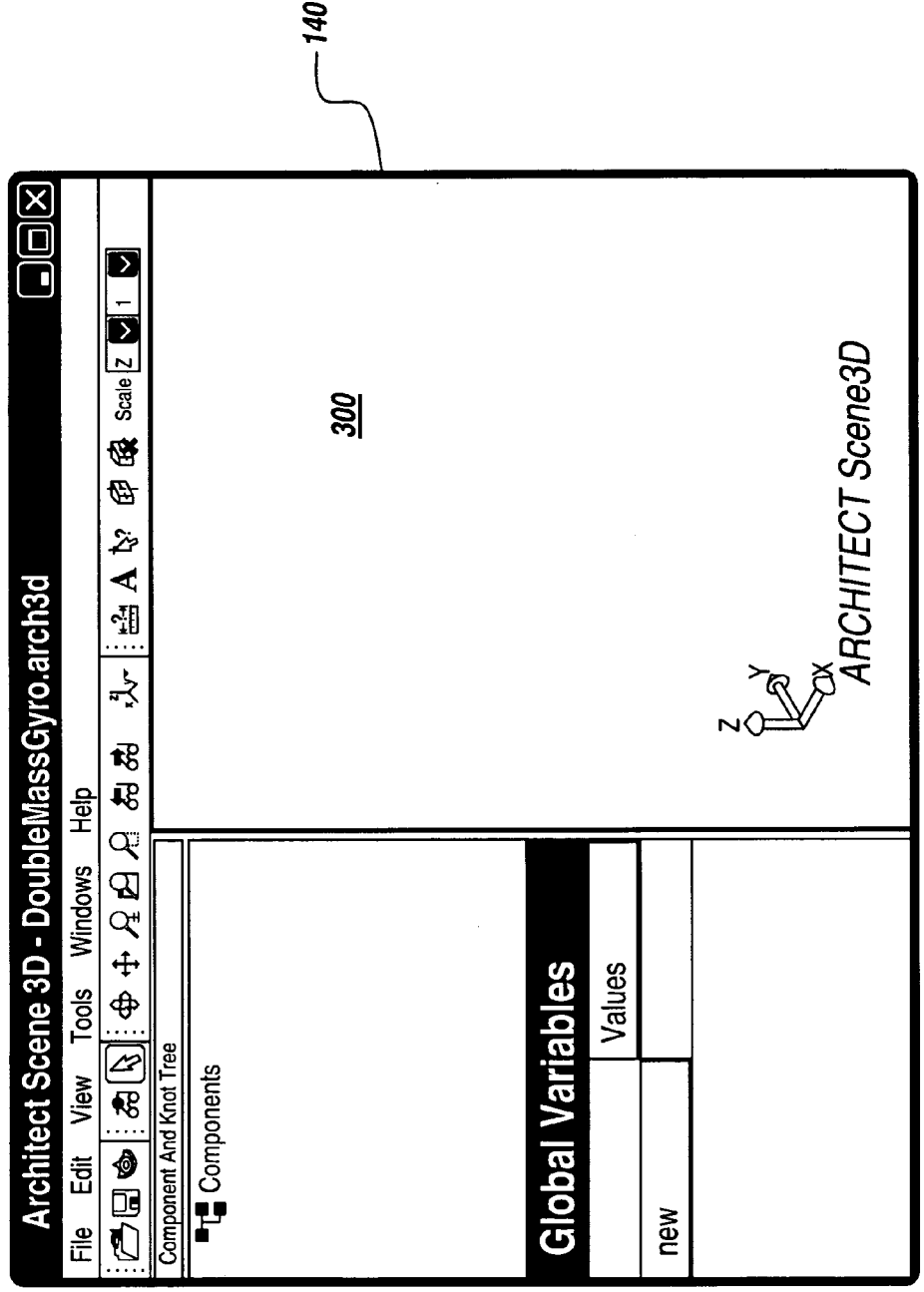
FIG. 2A depicts an empty 3-D view generated by a schematic editor of the 3-D design environment prior to the MEMS device assembly.
Figure 2B:
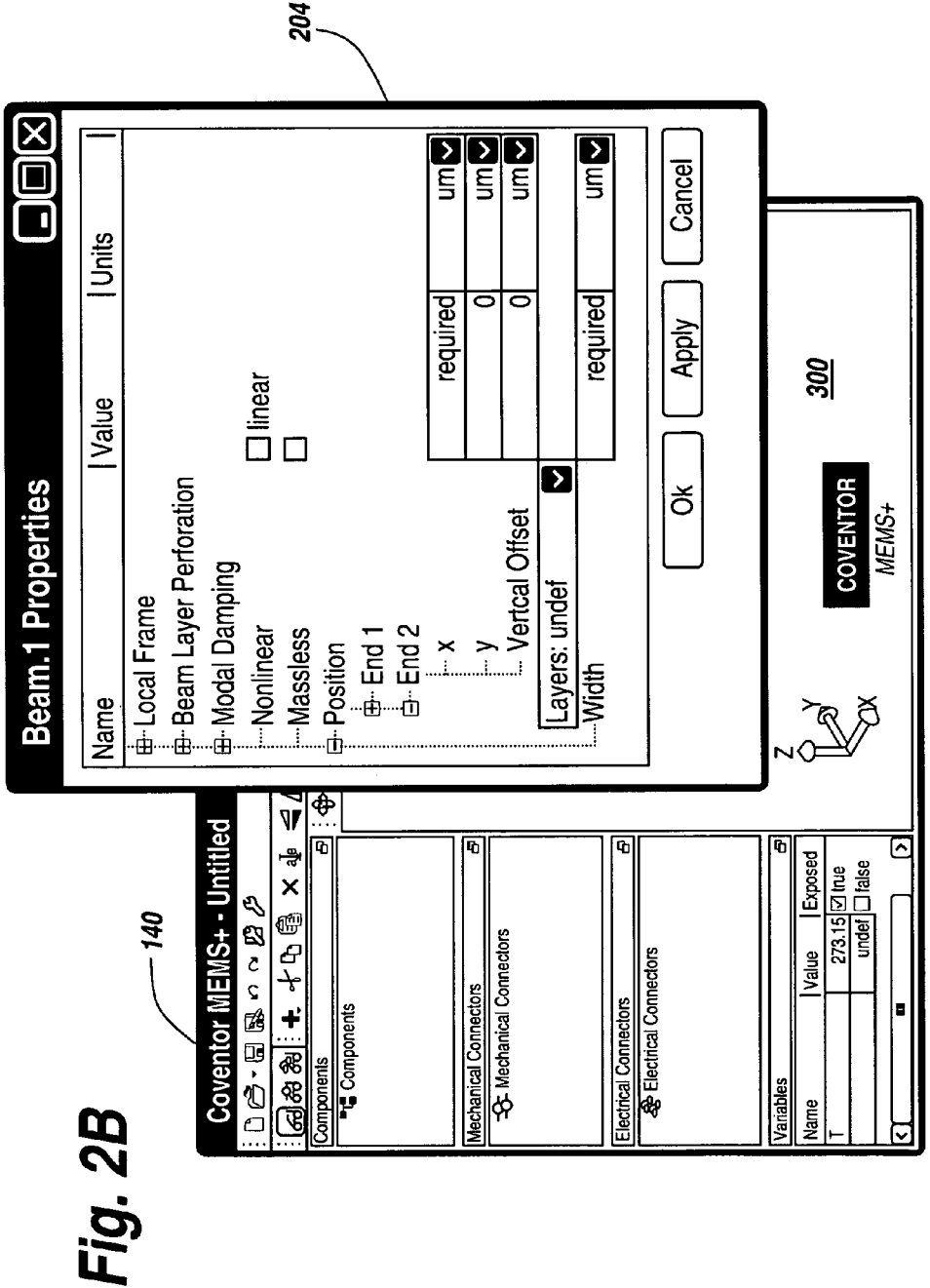
FIG. 2B depicts parameterization of an exemplary component selected from a component library using global variables inside the 3-D schematic editor.

FIGS. 2A and 2B depict the 3-D view 300 used to create a MEMS device model in greater detail. FIG. 2A depicts an empty 3-D view 300 generated by the 3-D schematic editor 140. A user creates the MEMS device model by selecting components from a MEMS component library 110 and arranging them in the 3-D view 300. FIG. 2B displays a parameter box 204 listing configurable parameters associated with a selected MEMS component.

There are two categories of parameters that are relevant for multi-physics device design. The first category consists of the material properties and geometric parameters that are determined by the manufacturing process. The second category consists of the dimensional parameters of the components of the multi-physics device model, such as length, width, number of comb fingers, etc., that are determined by the user, i.e. the MEMS engineer. The parameterization of the second category is illustrated in FIG. 3.

Figure 3:
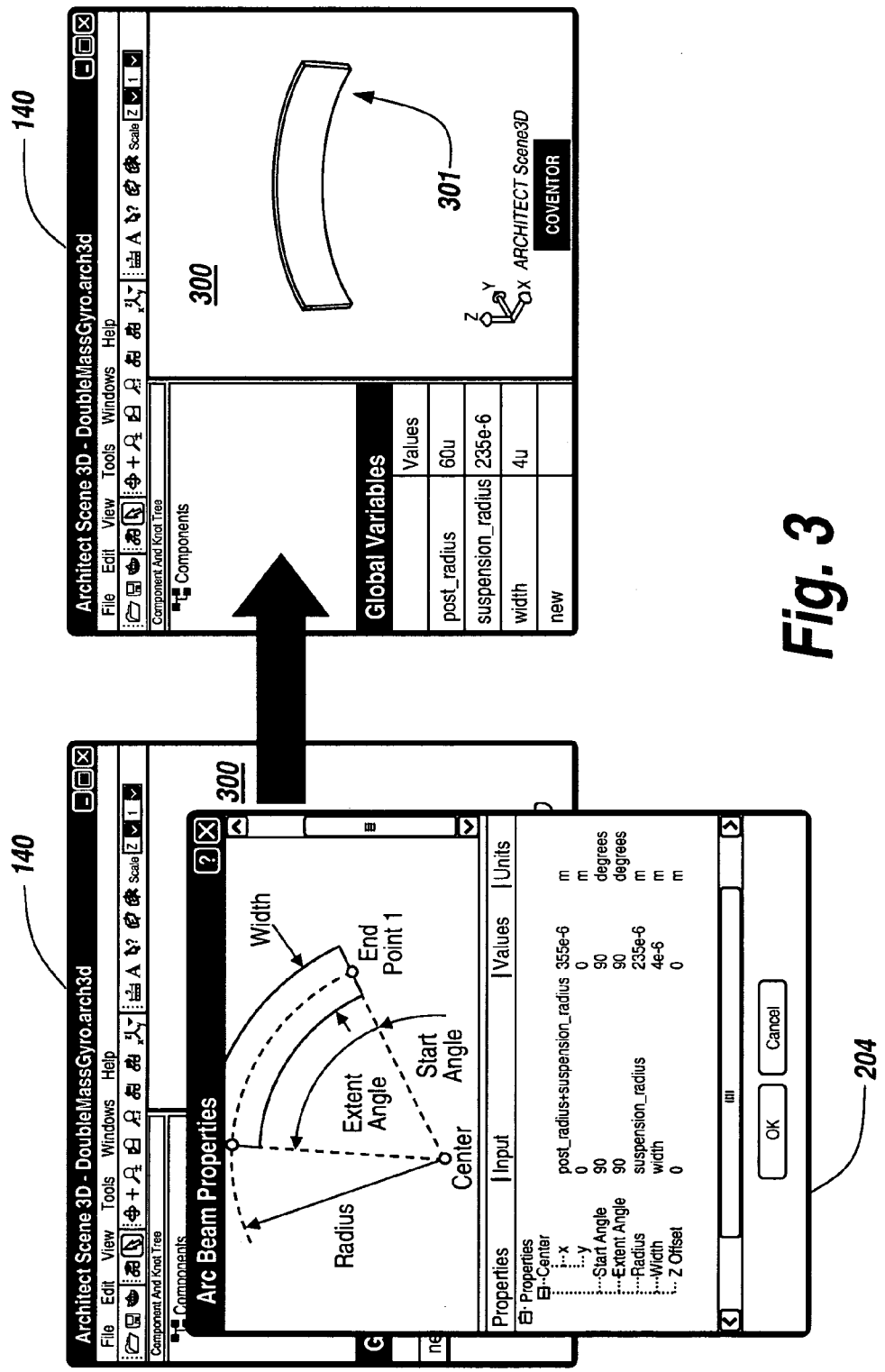
FIG. 3 depicts parameterization of another exemplary component selected from a component library using global variables inside the 3-D schematic editor and the 3-D view of the selected exemplary part.

FIG. 3 illustrates an arc beam as an exemplary MEMS device model component 151 selected from the MEMS component library 110. The user 10 defines the parameters of the arc beam using a pop up menu 204. Once the parameterization of the component 151 is complete, a 3-D view of the arc beam component 301 is depicted in the 3-D view 300. The user 10 may select additional components and generate corresponding 3-D views for the selected components. The 3-D views can be connected (mechanically, electrically, optically, etc) based on user selection or automatically by identifying touching component faces in the corresponding 3-D models. For example, a beam and a rigid plate component may be connected automatically by recognizing that their shapes touch or intersect each other. At the end of the design process, a 3-D view 300 of the entire MEMS device model 150 is provided to the user 10.

Figure 4:
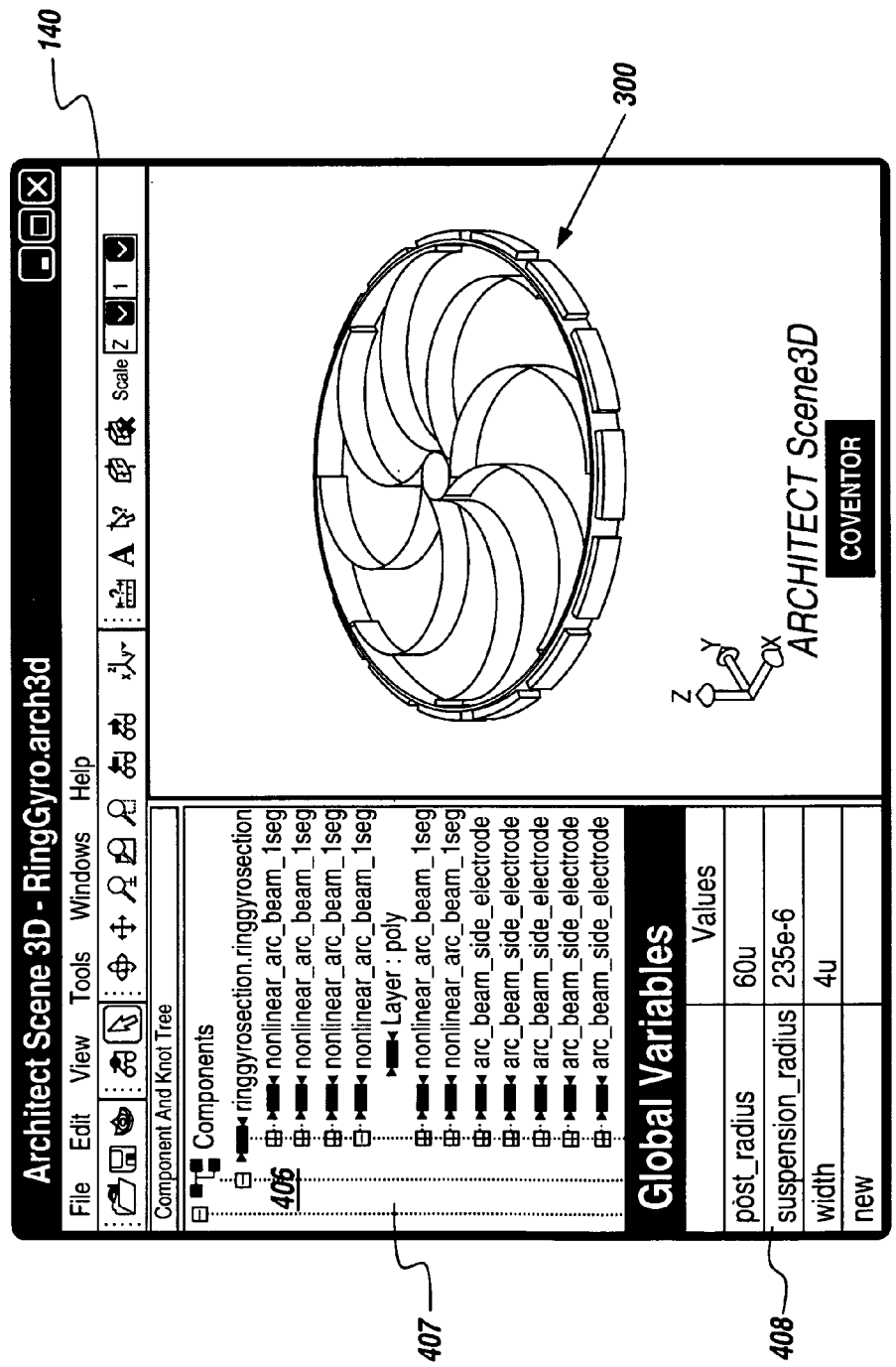
FIG. 4 depicts an exemplary completed MEMS device model displayed in the 3-D schematic editor and a listing of global variables used for component parameterization.

FIG. 4 illustrates an exemplary the 3-D view of a ring gyroscope model 300. The 3-D view 300 is a composite of individual 3-D views of selected MEMS device model components. As further illustrated in FIG. 4, a list 406 of all MEMS components used in the MEMS device model 150 is displayed in a window 407 of the 3-D design environment 100. The list of the components may be organized hierarchically to better illustrate the structure of the MEMS device model 150. The user 10 may select one or more components from the list 406 and see the global variables associated with the selected component(s) in a window 408 of the 3-D design environment 100.

Figure 5A:
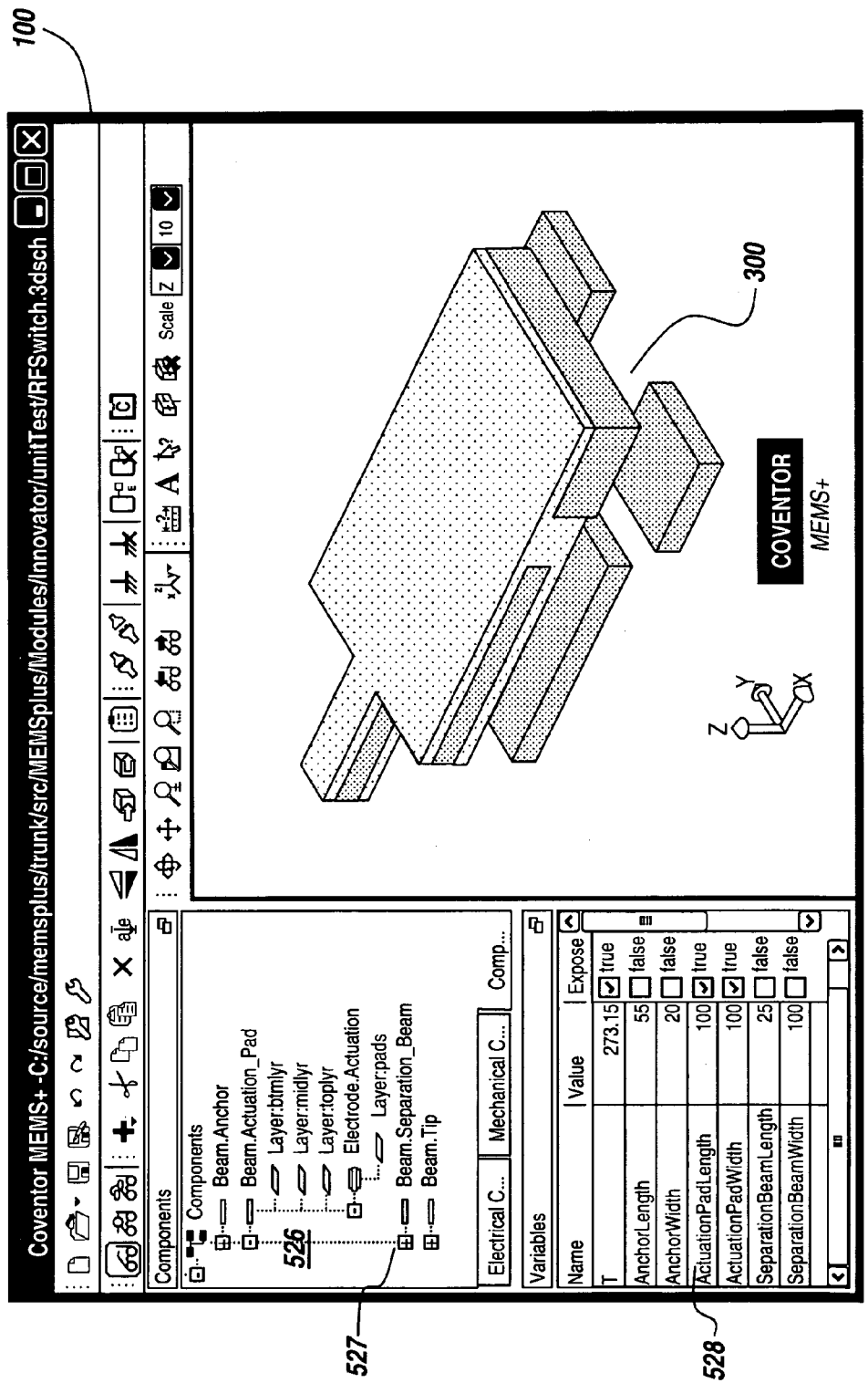
FIG. 5A depicts another exemplary completed MEMS device model displayed in the 3-D view generated by the 3-D schematic editor and a listing of global variables used for component parameterization.
Figure 5B:
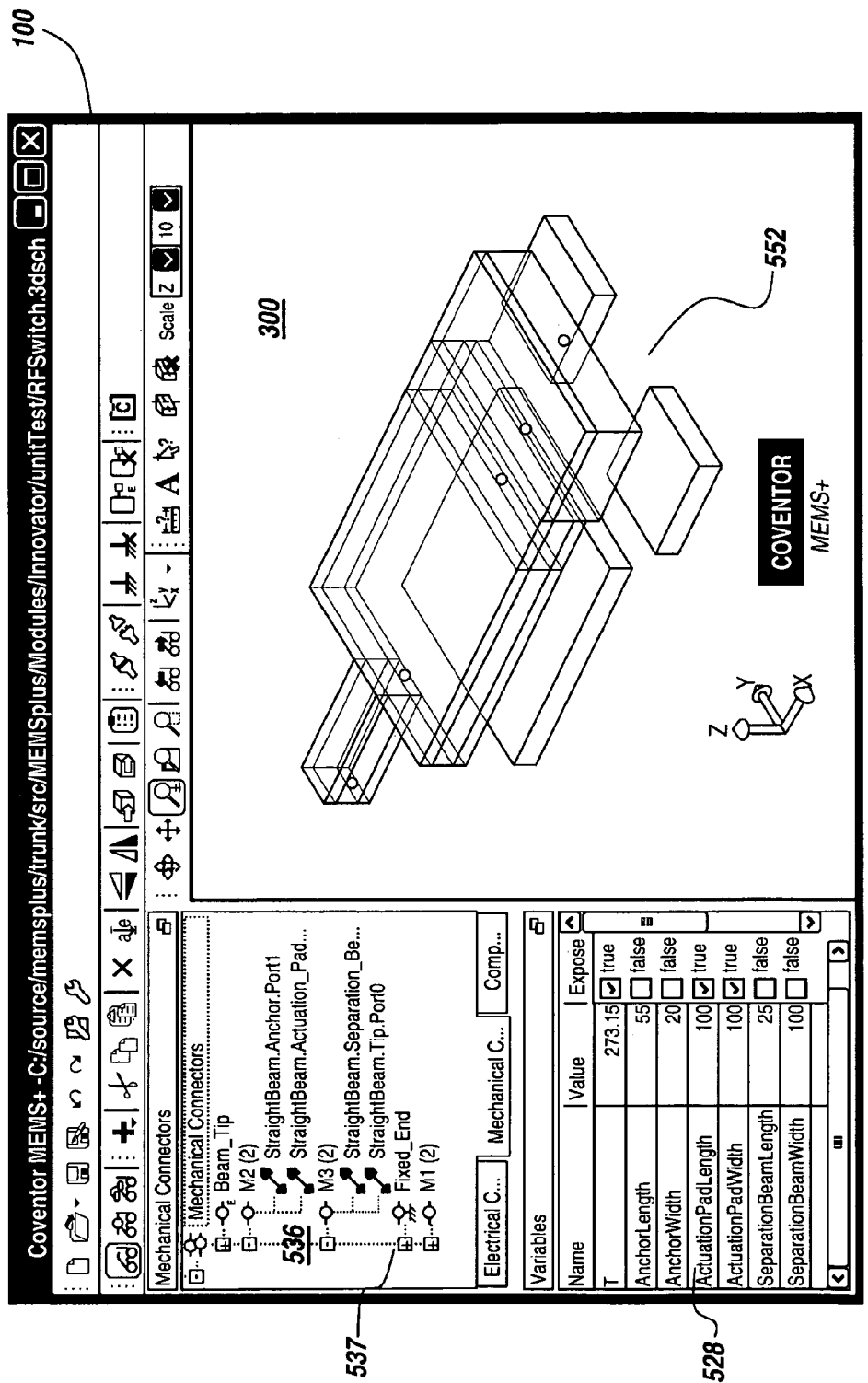
FIG. 5B illustrates mechanical connectors of the exemplary MEMS device model illustrated in FIG. 5A.
Figure 5C:
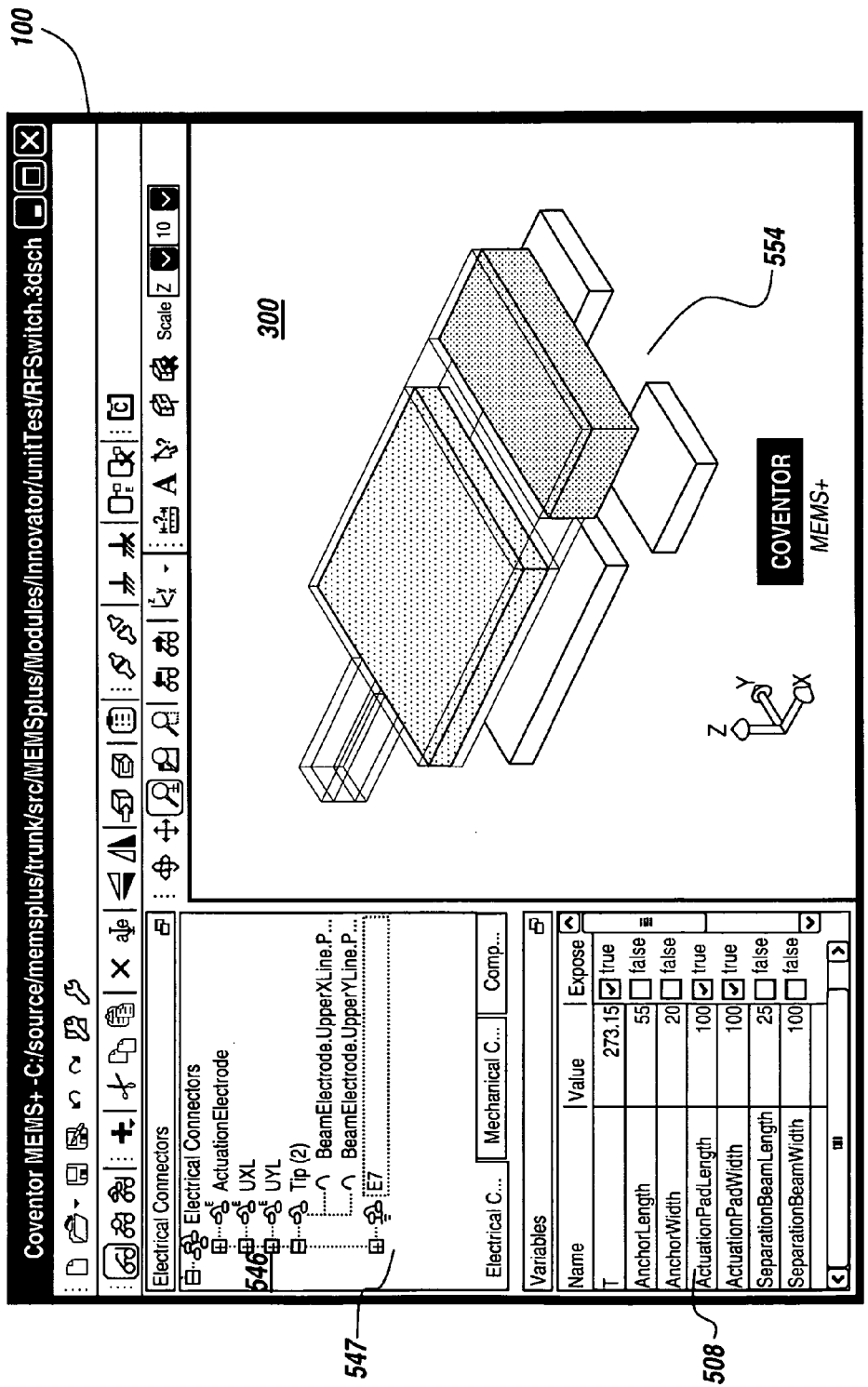
FIG. 5C illustrates electrical connectors of the exemplary MEMS device model illustrated in FIG. 5A.

FIGS. 5A-5C illustrate an exemplary the 3-D view 300 of another MEMS device model, i.e. a Radio Frequency (RF) switch. As shown in FIG. 5A, a list 526 of all components depicted in the 3-D view of the RF switch 300 is displayed as a tree structure on a window pane 527 of the 3-D design environment 100. The list 526 of the components may be organized hierarchically to better illustrate the structure of the view of the 3-D view of the RF switch 300. The user 10 may select one or more components from the list 526 and see the global variables associated with the selected component(s) on a window 528 of the 3-D design environment 100. As it can be seen from the component tree, the RF switch illustrated in FIG. 5A includes 4 basic building blocks, i.e. components: one anchor and 3 beams.

FIG. 5B illustrates the mechanical connectors 552 depicted in the 3-D view of the RF switch 300 illustrated in FIG. 5A. A list of the mechanical connectors 536 is displayed in a tree view in a window 537 of the 3-D design environment 100. The view of the mechanical connectors 352 illustrates which components are linked together. Visual cues may be used to illustrate the connections between mechanical components. For example, in FIG. 5B the mechanical components are illustrated partially transparent and the mechanical connectors between the components are indicated by highlighted dots. Connected components would move together as a single piece.

FIG. 5C illustrates the electrical connectors 554 of the RF switch illustrated in FIG. 5A. A list of the electrical connectors 546 is displayed in a tree view in a window 547 of the 3-D design environment 100. The electrical connectors view 554 illustrates electrical connectivity among components using visual cues such as colors, opaque/transparent display, etc. Connected components would move together as a single piece. For example, electrical layers may be shown as solid pieces in the 3-D view of the device model.

In addition to tailoring the dimensions of the components of a multi-physics device, it is sometimes necessary to tailor the fabrication process to a particular multi-physics device in order to achieve the design goals. Thus the fabrication process is an important "free parameter" in multi-physics device designs that often needs to be refined as the development progresses. The flexibility to change the description of the fabrication process is missing from conventional IC design environments. In addition, behavioral models of electrical IC components can not be parameterized in terms of the process parameters. In multi-physics device design, the parameters of the process description can be varied as part of the design, thus the models must be parameterized with respect to the process parameters as well.

The embodiments of the present invention address the specific needs of users, i.e. MEMS designers, to parameterize process parameters by providing two external editors that are used to specify all relevant fabrication-specific data. The first external editor, the material property editor 600, is shown in FIG. 6A. The material property editor 600 is used to create a material database that contains all relevant physical as well as visual properties used in the 3-D design environment 100. Material properties may be defined as absolute values, variables or algebraic equations. A combination of variables and algebraic equations allows for properties to be mutually dependent on other properties, environmental variables, e.g. temperature and humidity, or entirely abstract variables such as the equipment settings of a given fabrication process. The user 10 can choose which variables are to be exposed to other users. For example, FIG. 6A illustrates that the electrical conductivity 602 of aluminum is given by an algebraic expression that depends on the temperature T. At the bottom of the FIG. 6A, the user chose to "expose" T to other users by checking the corresponding box 604 on the material property editor 600.

Figure 6B:
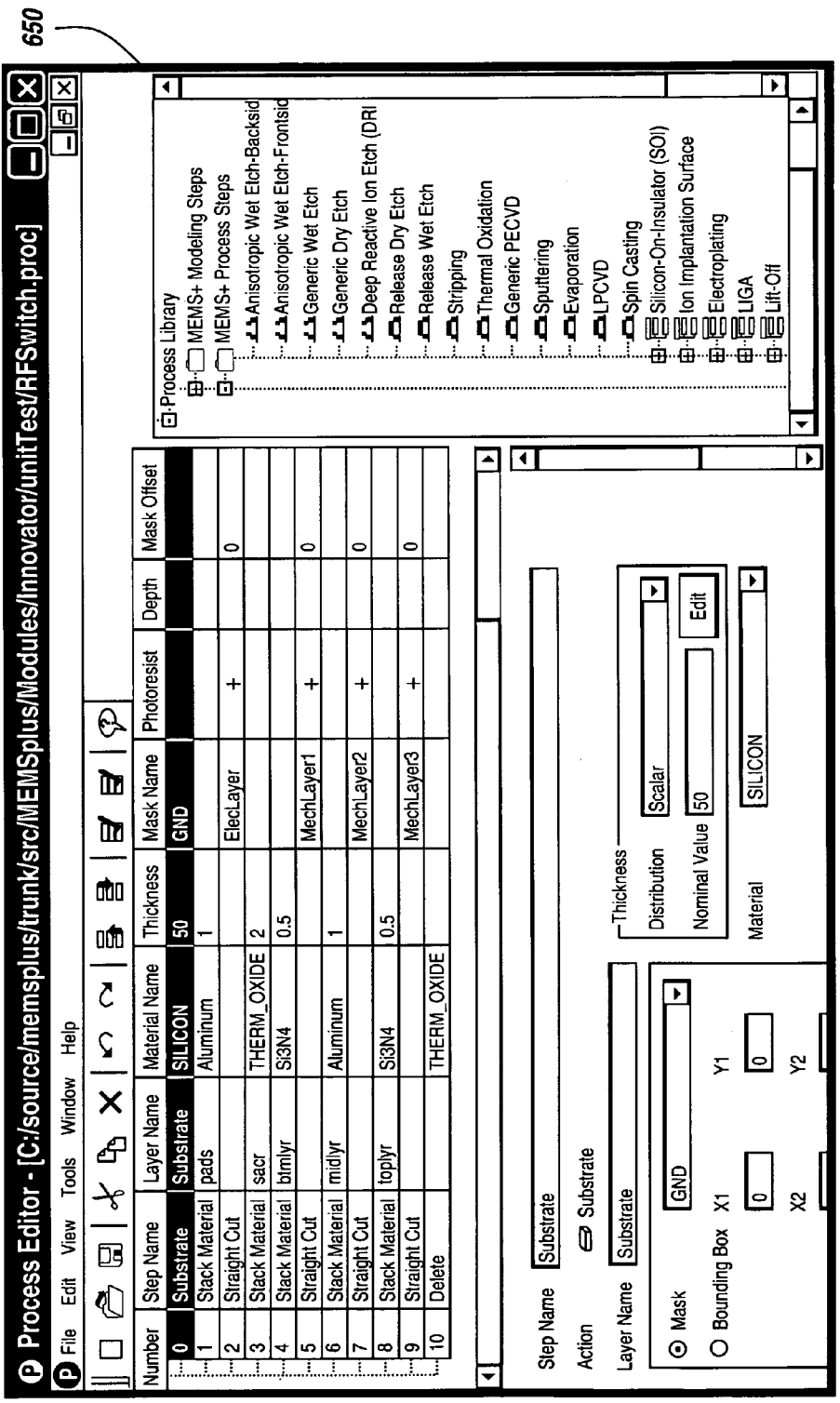
FIG. 6B depicts a second external editor, a process editor.

The second external editor, known as a process editor 650, is shown in FIG. 6B. The process editor allows the embodiments of the present invention to fully parameterize the behavioral model for the complete MEMS device that is shared with the system modeling environment with respect to manufacturing and design-dependent variables. The process editor 650 is used to define the sequence of the multi-physics device fabrication steps. The underlying process data includes all relevant information about the layer stack, such as the layer order, material type, thickness and sidewall profile. The process data is dependent on a material database. Each of the layers in the process data specifies a material type that must exist in the corresponding material database.

The MEMS device model 150 is a system model of the MEMS device designed in the 3-D Design Environment 100. The components 151, 152, 153, 154 and 155 correspond to the components 301, 302, 303, 304 and 305 that are visible in the 3-D view 300 of the MEMS device model 150 that were selected from the MEMS component library 110. The MEMS device model 150 also contains links 156, 157, 158 and 159 that define the connectivity among the components 151, 152, 153, 154 and 155.

After the MEMS device model 150 is completed in the 3-D design environment 100, the user 10 assigns a schematic symbol 236 to the MEMS device model 150. The MEMS device model may be exported to the system modeling environment 200 in the form of the schematic symbol 236 and a netlist that conveys connectivity information among components. The combination of the schematic symbol 236 and the netlist 237 is referred to as MEMS device 235 in the system modeling environment 200 in FIG. 1. The schematic symbol 236 represents the MEMS device model 150 in a schematic being simulated in the system modeling environment 200.

The use of the schematic symbol that represents the created MEMS device model by the embodiments of the present invention provides a way to control the amount of information presented to the IC designers who are responsible for designing the electronic circuits that surround a MEMS device. IC designers do not need to see all of the components that comprise the MEMS device in their schematic. Moreover, there are situations in which the MEMS designers and IC designers work for different companies and it is desirable to protect the intellectual property of the MEMS device design by hiding its details from the IC designers. Therefore, the embodiments of the present invention enable the MEMS designers to export a single symbol that represents the MEMS device to the system modeling environment and expose as ports to that symbol only the inputs, outputs and parameters that are of interest to the IC designers.

Figure 7:
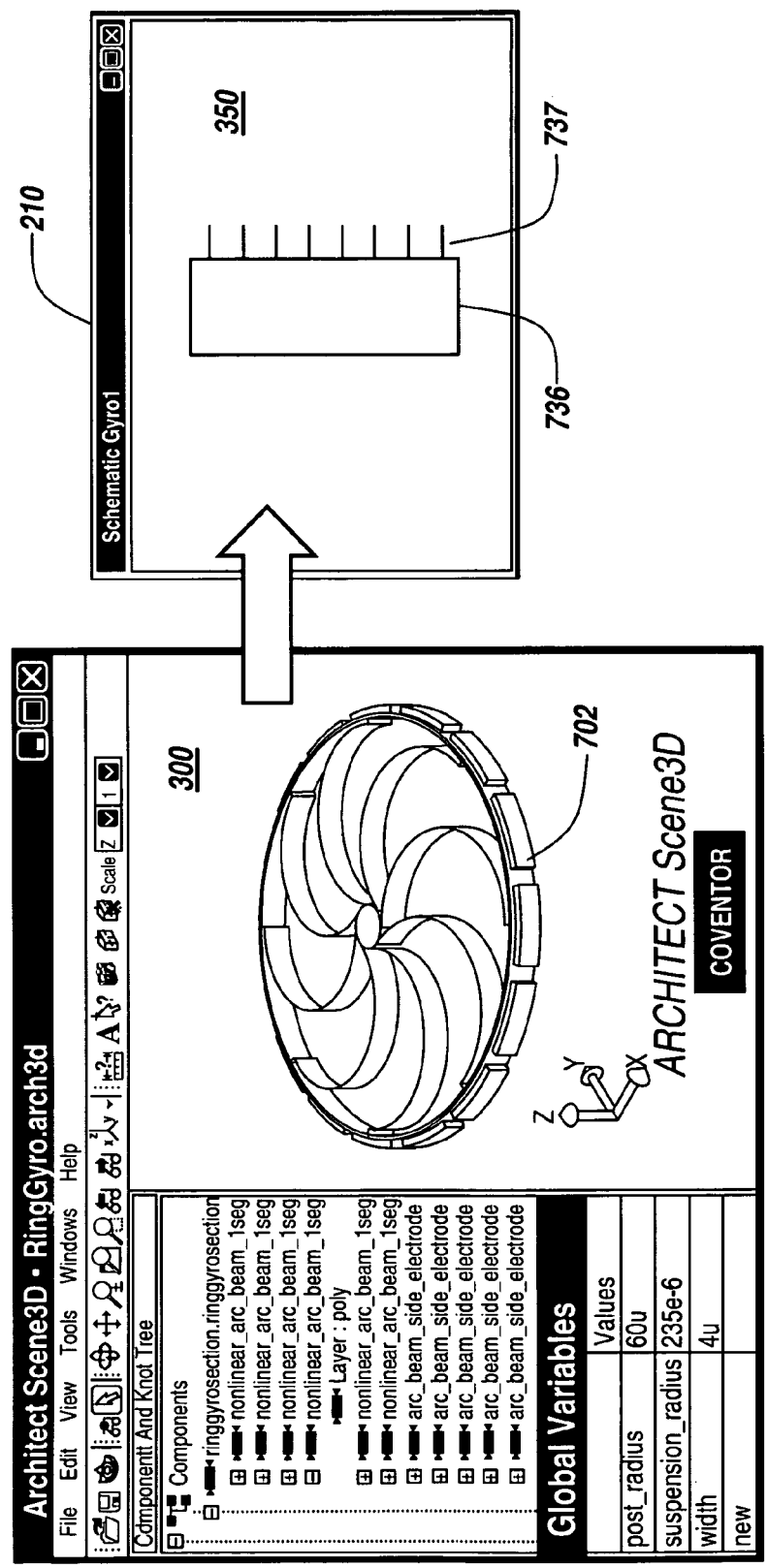
FIG. 7 depicts the 3-D design environment exporting a symbol of an exemplary MEMS device model together with the underlying behavioral model into the system modeling environment.

FIG. 7 illustrates a completed 3-D view 300 of an exemplary MEMS device model 150 in the 3-D design environment 100, e.g. a ring gyro, and a corresponding schematic symbol 736 in the schematic view 350 in the system modeling environment 200. As noted above, the user 10 also specifies which parameters of the MEMS device model 150 will be exposed in the system modeling environment 200. The exposed parameters are illustrated as the pins 737 of the schematic symbol 736. The pins 737 of the schematic symbol 736 represent the electrical connections needed to link the schematic symbol 736 with one or more other components in a schematic in the system modeling environment. Additional connectors to other physical degrees of freedom inside the MEMS device model 150 may be exposed based on user selection. Global variables of the MEMS device model 150 are preserved as parameters of the MEMS device symbol 736.

As illustrated in FIG. 1, the system modeling environment 200 includes a schematic editor 210, a circuit simulator 220, and a system component library 230. The schematic editor 210 is used to create and/or edit a system model 250. A user selects the MEMS device 235 and the electronic components 231 and 233 from the system component library 230 and places them in a schematic view 350 where the symbolic representations 232, and 234 of the model components 231 and 233 are joined with the schematic symbol 236 representing the MEMS device model 150 and displayed in two dimensions to the user. The user also specifies or draws connections between the symbols 352, 354, 356 and 358 in the schematic view 350.

Figure 8:
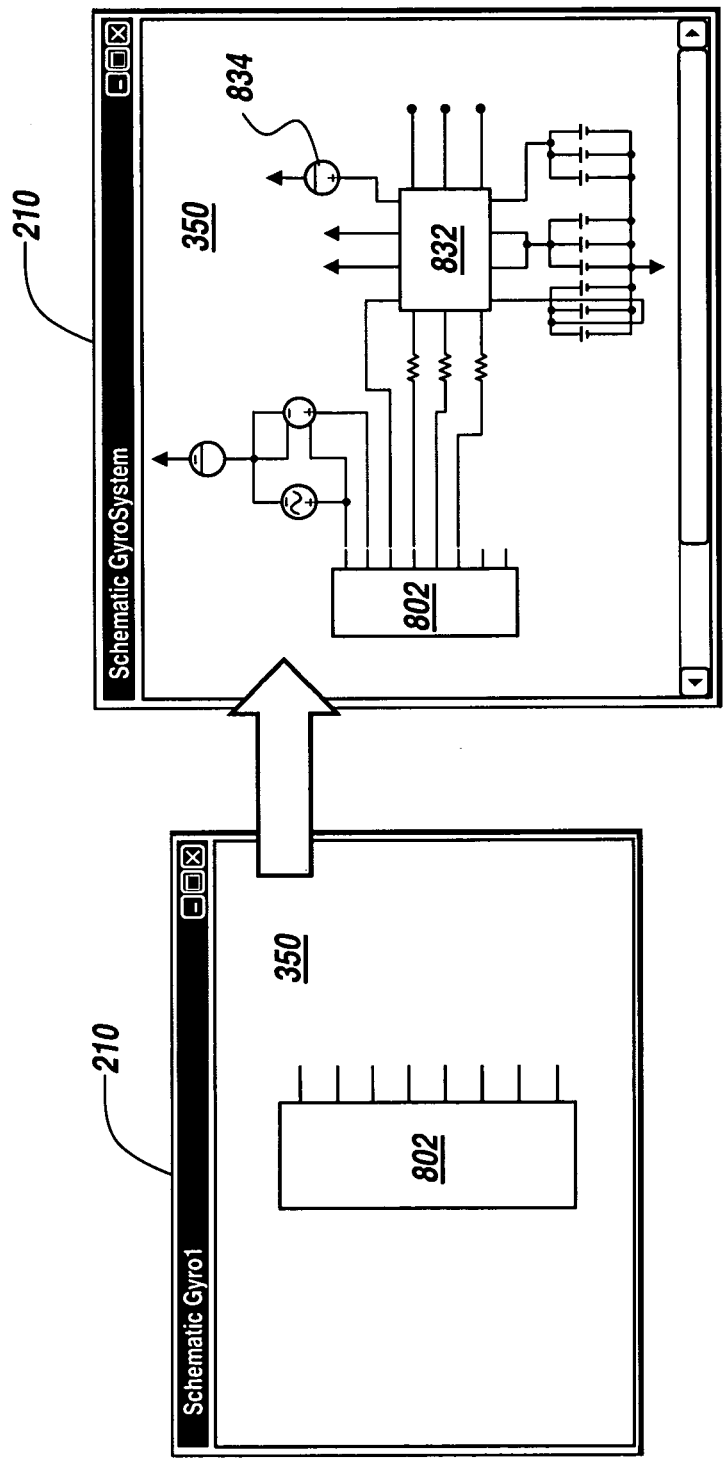
FIG. 8 depicts a symbol representative of the created MEMS device model being added to a schematic in the system modeling environment.

FIG. 8 illustrates the schematic view 350 of an exemplary complete system model 250. A schematic symbol 802 imported from the 3-D design environment 100 is connected to schematic symbols 832 and 834 representing components of the system component library 230 added to the exemplary MEMS device 235 in the system modeling environment 200. The user configures the parameters of the selected components interconnects their ports with the imported symbol representing the MEMS device created in the 3-D design environment to create a schematic of the entire device in the schematic view 350. One of ordinary skill in the art would appreciate that the user may be the same as the user designing the MEMS device model, i.e. the MEMS designer. Alternatively, the user may be a user designing the schematic view of the MEMS device model, i.e. the IC designer. It should also be appreciated that the components may be selected and configured prior to the importation of the schematic symbol from the 3-D design environment.

In an alternative embodiment, a user in the 3-D MEMS design environment may request a simulation and the symbol representing the MEMS device may be automatically exported, connected in a schematic, and simulated in the system modeling environment without additional user action.

When forming the schematic model in the schematic view 350, the symbols representing electronic components such as transistors, resistors, inductors and capacitors are connected to create the desired circuit behavior. The symbols that represent the electronic components have ports, or pins, that can be connected by wires to pins of other components. Each pin has a voltage and transfers current into or out of the component. In the schematic capture, components may represent entities from other physical domains, such as masses, plates, magnets, lasers, optical lenses, electrostatic comb structures and electrodes. The symbol ports of components represent inputs for electrical, mechanical, magnetic, fluidic, or optical sources, or can be input or output control pins for mechanical degrees of freedom, i.e. translational and rotational motions.

The schematic editor 210 maintains an underlying system model 250, which corresponds to the schematic view 350. The system model 250 contains references to particular instances 251, 252, 253 and 254 of the system components 231, 233 and 235. More than one instance may reference the same model component. The system model 250 also contains the connections 255, 256 and 257 between the component instances 251, 252, 253 and 254.

The schematic editor 210 is also used to specify the values of the parameters that define each schematic component instance 251, 252, 253 and 254. The parameters for each component 231, 233 and 235 are part of the component definition. The component definition of the MEMS device 235 may include all global parameters of the MEMS device model 150. The component parameters of the MEMS device 235 may include geometrical dimensions such as position, orientation, length, width and height, layer names or material properties like density and modulus of elasticity. In one embodiment changes of the parameters in components of the MEMS device 235 in the schematic editor 210 results in an automatically synchronized update of the 3-D View 300.

Figure 9:
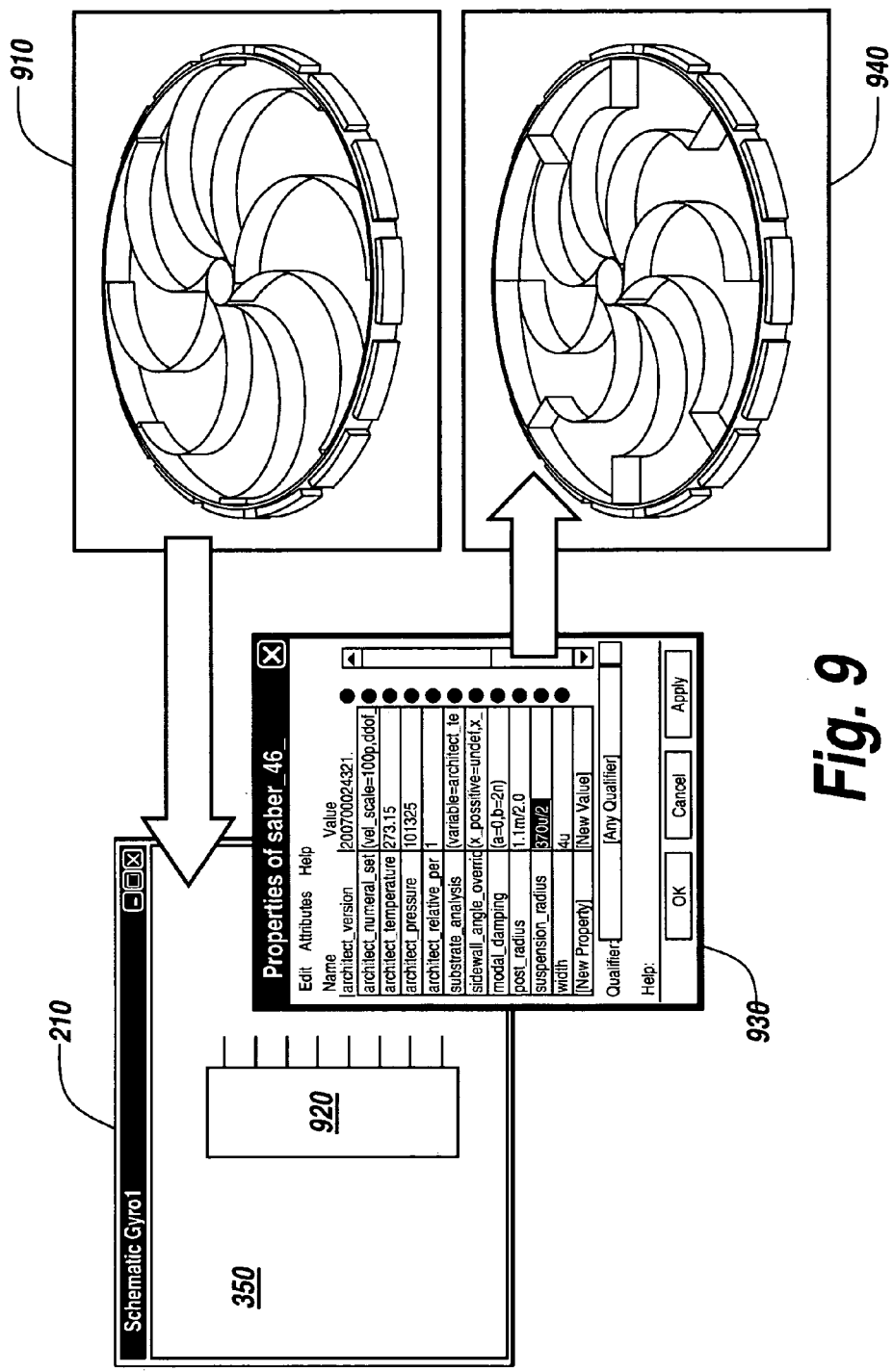
FIG. 9 depicts global variables used in the MEMS device model that are accessible as symbol parameters in the schematic editor of the system modeling environment.

FIG. 9 illustrates an exemplary 3-D view 910 of a MEMS device, a ring gyro. The MEMS device model 150 for the ring gyro 910 is exported into the system modeling environment 200. After selection by the user via the schematic editor 210, a symbol 920 that represents the MEMS device model 150 is displayed in the schematic view 250. The user may view and adjust parameters of the schematic symbol 920 representing the ring gyro 910 using the pop-up window 930. Those skilled in the art will recognize that the pop-up window 930 is provided for illustrative purposes and should not be construed as limiting as other mechanisms for adjusting parameters of the schematic symbol 920 may be used without departing from the scope of the present invention. The changes made in the schematic view 350 may be conveyed to the 3-D design environment 100, and an updated 3-D display 940 of the ring gyro may be displayed on the display device 14.

The system modeling environment 200 also includes a circuit simulator 220. The circuit simulator 220 is used to perform simulations of the system model 250 represented in the schematic view 350 by numerically integrating a system of coupled ordinary differential equations. The user may run a simulation of the schematic model 250 in the circuit simulator 220 that will evaluate the MEMS device behavioral model at each simulation point, i.e. time step or frequency. The user may run DC, AC and transient simulations of the model to confirm the device performance. The execution of the simulation produces a simulation result 240. The simulation result 240 is transferred back into the 3-D design environment 100 in order to be displayed using the 3-D simulation result visualizer 120. The 3-D simulation result visualizer 120 programmatically provides continuous updates of the individual MEMS components' (301, 302, 303, 304 and 305) 3-D views, resulting in an animation of the mechanical motion of the 3-D view 300 of the entire MEMS device model 150.

Figure 10:
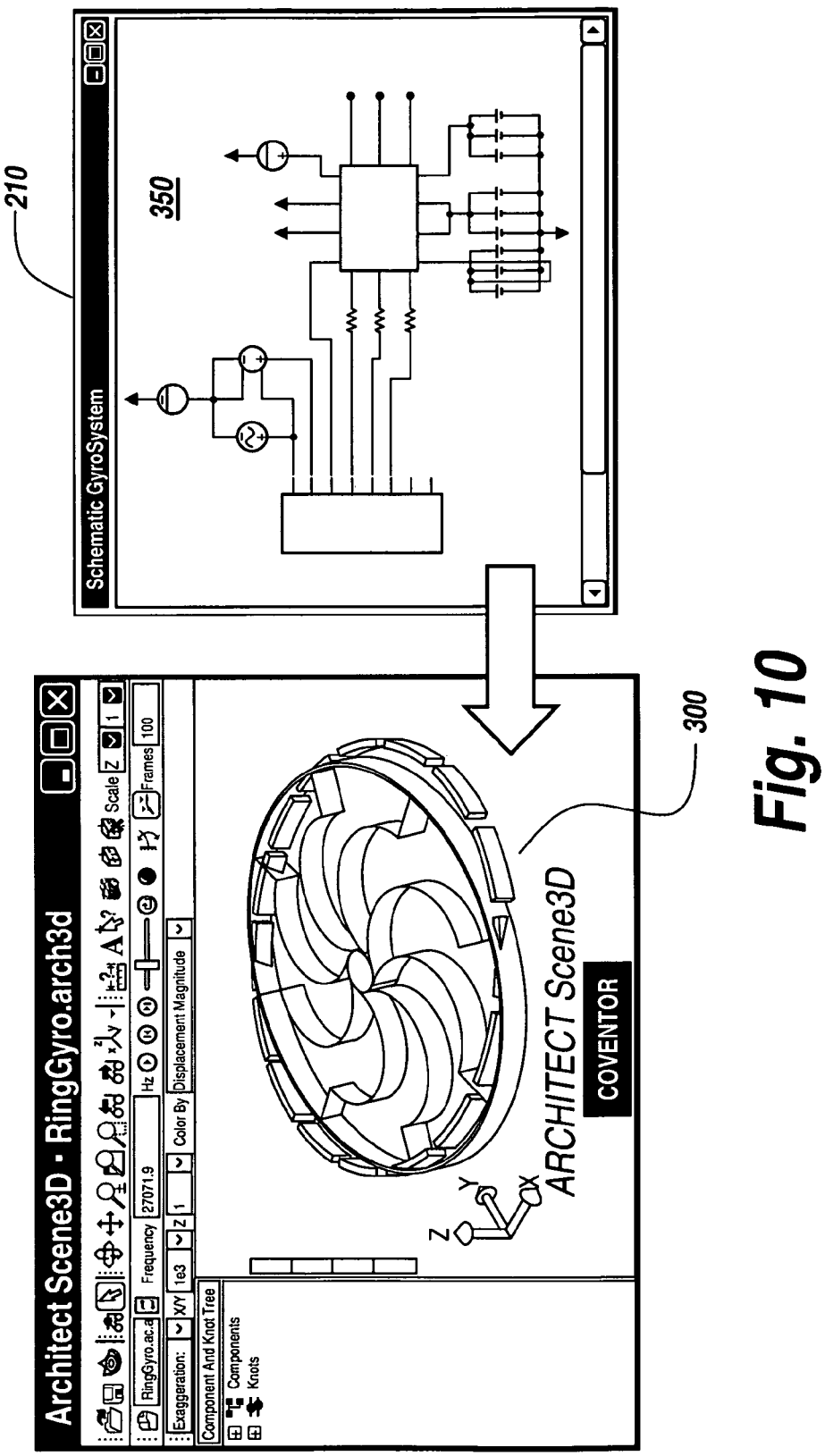
FIG. 10 depicts the transfer of the simulation results from the system modeling environment into the 3-D design environment and the animation of the results in the 3-D view.

As illustrated in FIG. 10, a 3-D simulation result visualizer 120, provided in the 3-D design environment 100, uses the simulation result 240, the system model 250 and the MEMS device model 150 to provide a 3-D view 300 of the simulation result 240 to the user 10. The simulation result 240 from a simulation of system model 250 depicted in the schematic view 350 is fed to the 3-D simulation result visualizer 120. The simulation result visualizer 120 works in conjunction with 3-D view generators 112, 114 and 116 to produce a 3-D view 300 of the simulation result 240 by progressively altering the 3-D view 300 to reflect changes in position over time, frequency or any other physical quantity being varied during the simulation of the system model 250.

Figure 11:
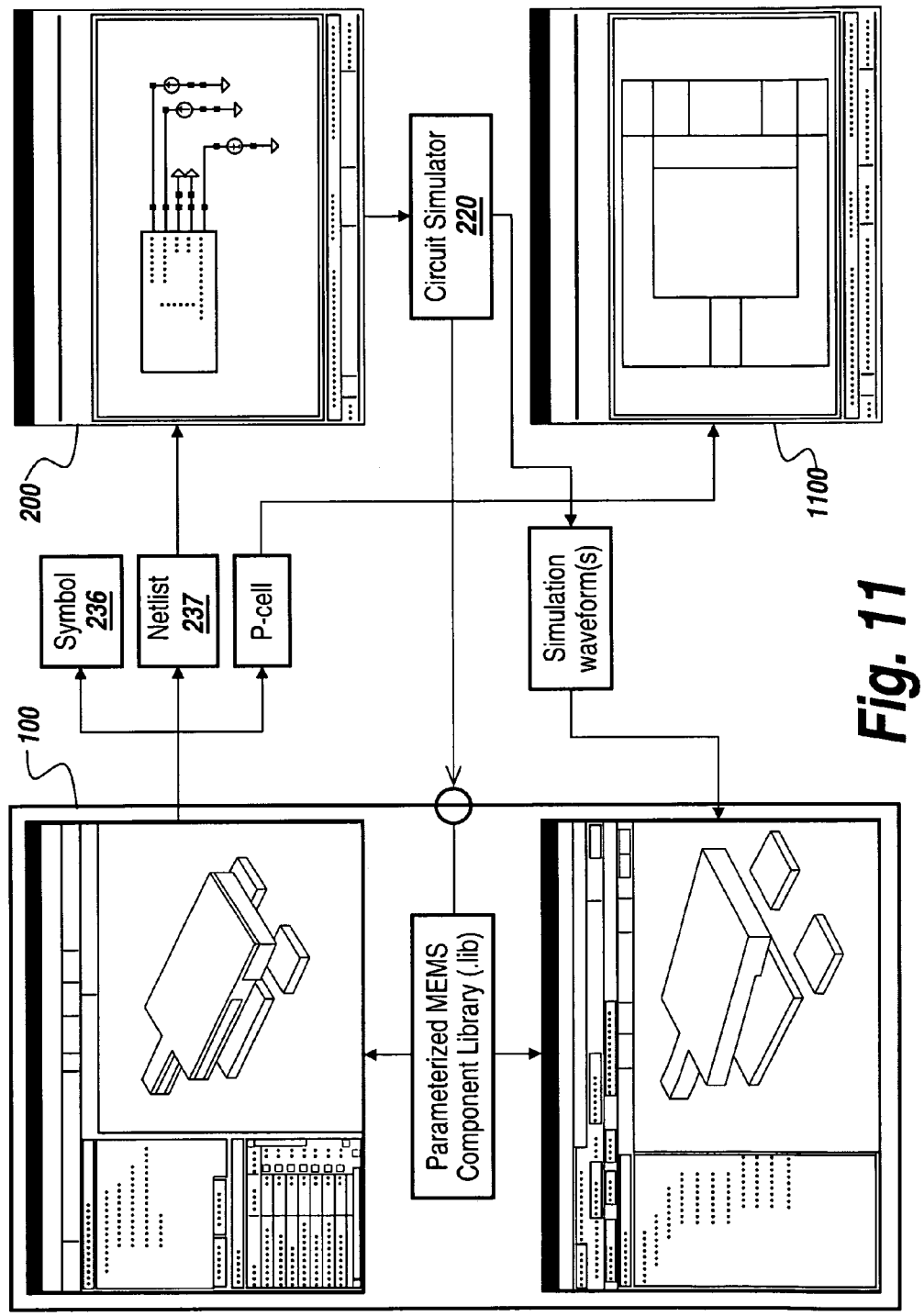
FIG. 11 illustrates an overview of the design process including the 3-D design environment and the system modeling environment.

FIG. 11 illustrates an alternate overview of the design process discussed herein including the 3-D design environment 100, the system modeling environment 200 and a layout editor 1100. As discussed above, the user creates a 3-D MEMS device model 150 representing the MEMS device in the 3-D design environment 100. After the MEMS device model 150 is completed, it can be exported to a system modeling environment 200. The model export involves the steps of creating a schematic symbol 236 representing the MEMS device 235, and exporting both the MEMS device symbol 236 and corresponding device model 150 in a format that is compatible with the system modeling environment 200. The exported device model 150 may be in the form of a netlist 237, i.e. a data structure that describes a system model. The created symbol 236 may have electrical connection pins needed to link the MEMS device symbol 236 with other schematic symbols in the system modeling environment 200. Additional connectors to other non-electrical degrees of freedom inside the MEMS device model may optionally be exposed in the MEMS device symbol 236. All global variables used in the MEMS device model 150 may be preserved as parameters of the created schematic symbol 236. These parameters may include geometrical, material or any other type of global variables used during the device definition in the 3-D design environment 100.

In the system modeling environment 200, a user forms a system model 250 by connecting the MEMS device 235 represented by the symbol 236 and other components 231, 233 and 235 from the system component library 230 in a schematic view 200. Upon completing the system model 250, the user runs a simulation of the system model 250 using the circuit simulator 220. The simulation result 240 is exported to the 3-D design environment 100 to be used in an animation of the 3-D view 300 of the MEMS device model 150. When the user is satisfied with the design, the user may export a parameterized layout cell (p-cell) to a layout editor 1100.

Figure 12:
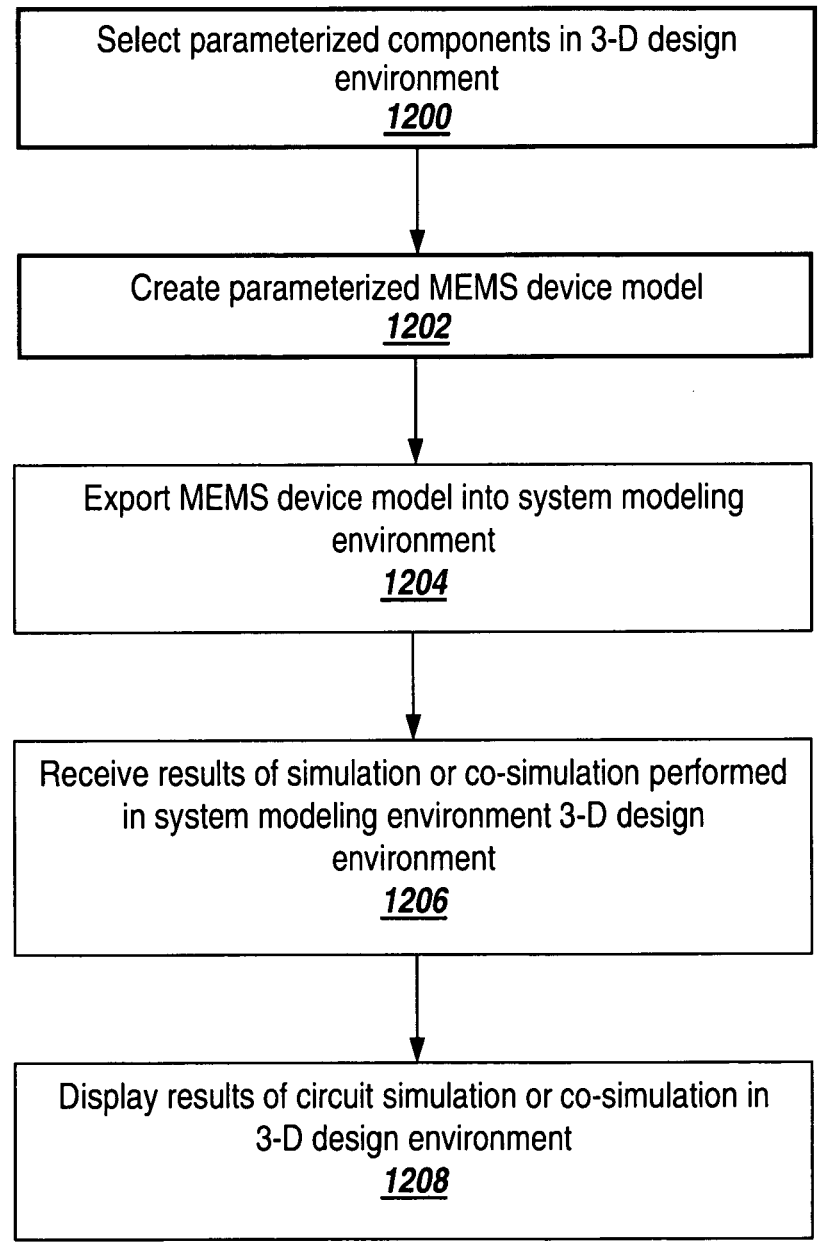
FIG. 12 is a flowchart of the sequence of steps followed by an embodiment of the present invention.

FIG. 12 is a flowchart of a sequence of steps followed by an embodiment of the present invention. The sequence begins when a user selects parameterized components in a 3-D design environment (step 1100). The user creates a MEMS device model by assembling the selected components in a 3-D view (step 1102). The created MEMS device model is then exported to a component library of a system modeling environment (step 1104). Results of a simulation or co-simulation run or being run in the system modeling environment using the exported MEMS device model may subsequently be received in the 3-D design environment (step 1106). The received results may be displayed in an animated fashion in the 3-D design environment (step 1108).

The behavioral models of the multi-physics devices discussed above are sufficiently sophisticated to fully represent the behavior of the multi-physics devices, capturing, for example, cross-coupling between the mechanical degrees of freedom. These behavioral models are more accurate than reduced-order models or look-up tables. The behavioral models and layout p-cells are fully parameterized both with respect to manufacturing-dependent variations and geometric attributes of the design, enabling design and yield optimization studies in the EDA environment. The automatic hand-off and cross-linking between the multi-physics devices and system modeling environments eliminates inevitable human errors that arise in any manual hand-off process.

Those skilled in the art will recognize that the user 10 may be separated from the computing device 12 via a network such as the Internet. Similarly, the components used by embodiments of the present invention may appear in a distributed manner over a network rather than being consolidated in a single computing device 12 and the multi-physics device components may be stored other than in a component library.

The present invention may be provided as one or more computer-readable programs embodied on or in one or more computer-readable mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include FORTRAN, C, C++, C#, or JAVA. The software programs may be stored on or in one or more mediums as object code. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method of designing and simulating Micro Electro-Mechanical System (MEMS) devices, comprising:

receiving a user input selecting a plurality of parameterized components from a MEMS component library, each of the parameterized components being parametric and associated with a behavioral model;

assembling a new parameterized MEMS device model in a three-dimensional (3-D) graphical view generated by a 3-D MEMS design environment, by connecting, in response to user commands, representations of the selected parameterized components in the 3-D graphical view, the assembling automatically creating the new parameterized MEMS device model using the behavioral models of the selected components and data indicating how the representations of the components are connected in the 3-D graphical view;

exporting a symbol representing the new parameterized MEMS device model from the 3-D MEMS design environment into a system modeling environment; and automatically providing the behavioral models associated with the parameterized components of the new parameterized MEMS device model to a circuit simulator for evaluation during simulations or co-simulations of the system.

2. The method of claim 1, further comprising:

receiving, by the 3-D MEMS design environment, the results of a circuit simulation or co-simulation of a schematic design performed in the system modeling environment that utilized the new parameterized MEMS device model; and displaying the results of the circuit simulation or co-simulation in the 3-D graphical view in the 3-D MEMS design environment.

3. The method of claim 2 wherein displaying the results further comprises:

animating the motion of a MEMS device associated with the new parameterized MEMS device model while displaying the results of the circuit simulation or co-simulation in the 3-D graphical view in the 3-D MEMS design environment.

4. The method of claim 1, further comprising:

evaluating the new parameterized MEMS device model using the MEMS component library during the circuit simulation or co-simulation, the evaluating occurring during a DC, AC or transient simulation following an establishment of communication between the circuit simulator or co-simulator in the system modeling environment and the MEMS component library.

5. The method of claim 1 wherein the symbol includes pins representing electrical connections for the new parameterized MEMS device model.

6. The method of claim 5 wherein the number of pins on the symbol is configurable by a user while creating the new parameterized MEMS device model.

7. The method of claim 1, further comprising:

exporting a parameterized layout cell from the 3-D MEMS design environment to a layout editor or viewer in the system modeling environment allowing the display of the layout cell, the parameterized layout cell being used to generate a visible instance of the layout of a MEMS device associated with the new parameterized MEMS device model.

8. The method of claim 1, wherein the selecting of a plurality of parameterized components, further comprises:

indicating at least one parameter of one of the selected parameterized components to be hidden or exposed in the system modeling environment.

9. The method of claim 1 wherein at least one of the selected parameterized components includes a material parameter.

10. The method of claim 1 wherein at least one of the selected parameterized components includes a fabrication process parameter.

11. A computer-implemented method of designing and simulating Micro Electro-Mechanical System (MEMS) devices, comprising:
importing a parameterized MEMS device model into a system modeling environment, the parameterized MEMS device model assembled initially in a three-dimensional (3-D) graphical view generated by a 3-D MEMS design environment, by connecting, in response to user commands, representations of a plurality of parameterized components selected from a MEMS component library, each of the parameterized components associated with a behavioral model, the assembling automatically creating the parameterized MEMS device model using the behavioral models of the selected components and data indicating how the representations of the components are connected in the 3-D graphical view;
connecting a symbol representative of the parameterized MEMS device model into a schematic in the system modeling environment, the schematic displaying an integrated circuit (IC) design; and
performing a circuit simulation or co-simulation of the schematic in the system modeling environment.

12. The method of claim 11, further comprising:
importing a parameterized layout cell from the 3-D MEMS design environment into a layout editor in the system modeling environment; and
generating a layout instance of a MEMS device associated with the parameterized MEMS device model from the parameterized layout cell.

13. The method of claim 11, further comprising:
exporting the results of the performed circuit simulation or co-simulation to the 3-D MEMS design environment.

14. The method of claim 11 wherein a netlist containing connectivity information for the MEMS device model is received by the system modeling environment from the 3-D MEMS design environment.

15. A non-transitory computer-readable medium holding computer-executable instructions for designing and simulating Micro Electro-Mechanical System (MEMS) devices, the instructions when executed causing a computing device to:
receive a user input selecting a plurality of parameterized components from a MEMS component library, each of the parameterized components being parametric and associated with a behavioral model;
assemble a new parameterized MEMS device model in a three-dimensional (3-D) graphical view generated by the 3-D MEMS design environment by connecting, in response to user commands, representations of the selected parameterized components in the 3-D graphical view, the assembling automatically creating the new parameterized device model using the behavioral models of the selected components and data indicating how the representations of the components are connected in the 3-D graphical view;
export a symbol representing the new parameterized MEMS device model from the 3-D MEMS design environment into a system modeling environment; and
automatically provide the behavioral models associated with the parameterized components of the new parameterized MEMS device model to a circuit simulator for evaluation during simulations or co-simulations of the system.

16. The medium of claim 15 wherein the instructions further cause the computing device to:
receive, by the 3-D MEMS design environment, the results of a circuit simulation or co-simulation of a schematic design performed in the system modeling environment; and
display the results of the circuit simulation or co-simulation in the 3-D graphical view in the 3-D MEMS design environment.

17. The medium of claim 16 wherein the execution of the instructions for displaying the results cause the computing device to:
animate the motion of a MEMS device associated with the new parameterized MEMS device model while displaying the results of the circuit simulation or co-simulation in the 3-D graphical view in the 3-D MEMS design environment.

18. The medium of claim 16, wherein the execution of the instructions cause the computing device to:
evaluate the new parameterized MEMS device model using the MEMS component library during the circuit simulation or co-simulation, the evaluating occurring during a DC, AC or transient simulation following an establishment of communication between the circuit simulator or co-simulator in the system modeling environment and the MEMS component library.

19. The medium of claim 15 wherein the symbol includes pins representing electrical connections for the new parameterized MEMS device model.

20. The medium of claim 19 wherein the number of pins on the symbol is configurable by a user while creating the new parameterized MEMS device model.

21. The medium of claim 15 wherein the execution of the instructions cause the computing device to:
export a parameterized layout cell from the 3-D MEMS design environment to a layout editor following the display, the layout cell used to generate a layout of a MEMS device associated with the new parameterized MEMS device model.

22. The medium of claim 15, wherein the execution of the instructions for selecting of a plurality of parameterized components cause the computing device to:
identify at least one parameter of one of the selected parameterized components as hidden or exposed in the system modeling environment.

23. The medium of claim 15 wherein at least one of the selected parameterized components includes a material parameter.

24. The medium of claim 15 wherein at least one of the selected parameterized components includes a fabrication process parameter.

25. A non-transitory computer-readable medium holding computer-executable instructions for designing and simulating Micro Electro-Mechanical System (MEMS) devices, the instructions when executed causing a computing device to:
import a parameterized MEMS device model into a system modeling environment, the parameterized MEMS device model assembled initially in a three-dimensional (3-D) graphical view generated by a 3-D MEMS design environment, by connecting, in response to user commands, representations of a plurality of parameterized components selected from a MEMS component library, each of the parameterized components associated with a behavioral model, the assembling automatically creating the parameterized MEMS device model using the behavioral models of the selected components and data indicating how the representations of the components are connected in the 3-D graphical view;

connect a symbol representative of the parameterized MEMS device model into a schematic in the system modeling environment, the schematic displaying an integrated circuit (IC) design; and perform a circuit simulation or co-simulation of the schematic in the system modeling environment.

26. The medium of claim 25, wherein the execution of the instructions further cause the computing device to:

import a parameterized layout cell from the 3-D MEMS design environment into a layout editor; and generating a layout of a MEMS device associated with the parameterized MEMS device model from the parameterized layout cell.

27. The medium of claim 25, further comprising:

exporting the results of the performed circuit simulation or co-simulation to the 3-D MEMS design environment.

28. The medium of claim 25 wherein a netlist containing connectivity information for the parameterized MEMS device model is received by the system modeling environment from the 3-D MEMS design environment.

29. A computer-implemented system for designing and simulating Micro Electro-Mechanical System (MEMS) devices, comprising:

a computing device hosting, or in communication with, a three-dimensional (3-D) MEMS design environment and a system modeling environment, the 3-D MEMS design environment enabling:

receiving a user input selecting a plurality of parameterized components from a MEMS component library, each of the parameterized components being parametric and associated with a behavioral model;

assembling a new parameterized MEMS device model in a 3-D graphical view generated by the 3-D MEMS design environment, by connecting, in response to user commands, representations of the selected parameterized components in the 3-D graphical view, the assembling automatically creating the new parameterized MEMS device model using the behavior models of the selected components and data indicating how the representations of the components are connected in the 3-D graphical view;

exporting a symbol representing the new parameterized MEMS device model from the 3-D MEMS design environment into the system modeling environment;

automatically providing the behavioral models associated with the parameterized components of the new parameterized MEMS device model to a circuit simulator for evaluation during simulations or co-simulations of the system; and receiving, by the 3-D MEMS design environment, the results of a circuit simulation or co-simulation of a schematic design performed in the system modeling environment that utilized the new parameterized MEMS device model; and a display device in communication with the computing device, the display device displaying the results of the circuit simulation or co-simulation in the 3-D graphical view.

30. The system of claim 29 wherein one of the selected parameterized components includes a material parameter.

31. The system of claim 29 wherein one of the selected parameterized components includes a fabrication process parameter.

32. The system of claim 29 wherein the display of the results in the 3-D MEMS design environment animates a motion of a MEMS device associated with the new parameterized MEMS device model.

* * * * *